United States Patent
Scherrer

(10) Patent No.: US 8,950,274 B2
(45) Date of Patent: Feb. 10, 2015

(54) METHOD FOR MONITORING OSCILLATION CHARACTERISTICS IN A CORIOLIS, FLOW, MEASURING DEVICE

(71) Applicant: Endress + Hauser Flowtec AG, Reinach (CH)

(72) Inventor: Remy Scherrer, Oberdorf (FR)

(73) Assignee: Endress + Hauser Flowtec AG, Reinach (CH)

( * ) Notice: Subject to any disclaimer, the term of this patent is extended or adjusted under 35 U.S.C. 154(b) by 135 days.

(21) Appl. No.: 13/676,192

(22) Filed: Nov. 14, 2012

(65) Prior Publication Data

US 2013/0160565 A1    Jun. 27, 2013

(30) Foreign Application Priority Data

Nov. 15, 2011 (DE) .................. 10 2011 086 395

(51) Int. Cl.
*G01F 1/84* (2006.01)
*G01F 1/66* (2006.01)
*G01F 25/00* (2006.01)

(52) U.S. Cl.
CPC ............... *G01F 1/66* (2013.01); *G01F 1/8436* (2013.01); *G01F 25/0007* (2013.01)
USPC .................... 73/861.355; 73/11.08; 73/11.09; 73/12.12; 73/152.18; 73/861; 702/45; 702/48

(58) Field of Classification Search
CPC ..... G01M 17/04; G01M 17/045; B61F 9/005; B61K 9/00; E21B 47/10; E21B 49/10; E21B 47/00; E21B 2049/085; G01F 1/8436; G01F 1/8477; G01F 1/8413; G01F 1/849; G01F 3/221; G01F 3/226; G01F 3/225
USPC .................. 73/861.355, 11.08, 11.09, 12.12, 73/152.18, 861.354, 252, 268, 863.44; 702/45, 48
See application file for complete search history.

(56) References Cited

U.S. PATENT DOCUMENTS 8,104,361 B2    1/2012 Kolahi
2003/0006671 A1    1/2003 Hiedenstierna
(Continued)

FOREIGN PATENT DOCUMENTS

DE    102008059920 A1    7/2010

OTHER PUBLICATIONS

German Search Report, Mar. 28, 2012, Munich.
(Continued)

*Primary Examiner* — Peter Macchiarolo
*Assistant Examiner* — Mohammed Keramet-Amircola
(74) *Attorney, Agent, or Firm* — Bacon & Thomas, PLLC

(57) ABSTRACT

A method for monitoring oscillation characteristics in a Coriolis, flow measuring device and to a correspondingly formed, Coriolis, flow measuring device in the case of which an excited oscillatory system is simulated with a digital model, which has at least one fittable parameter. The simulating includes, in such case, excitating the digital model in the same manner as the oscillatory system, calculating a simulation response variable of the simulated oscillations according to the digital model, and, performed over a plurality of signal modulations, iterative conforming of the at least one, fittable parameter in such a manner that the simulation response variable interatively approaches the response variable. Furthermore, it is ascertained whether a corresponding limit value is exceeded by the at least one, interatively ascertained parameter value for the at least one, fittable parameter or by at least one variable derived from the at least one, iteratively ascertained parameter value.

14 Claims, 6 Drawing Sheets

(56) References Cited

U.S. PATENT DOCUMENTS

| | | | |
|---|---|---|---|
| 2007/0017274 A1* | 1/2007 | Wheeler et al. | 73/1.16 |
| 2009/0300429 A1 | 12/2009 | McCroskey | |
| 2011/0016986 A1* | 1/2011 | Henry | 73/861.355 |
| 2011/0016987 A1* | 1/2011 | Honegger | 73/861.355 |
| 2011/0098945 A1* | 4/2011 | McAnally | 702/48 |
| 2011/0154914 A1* | 6/2011 | Hussain et al. | 73/861.355 |
| 2011/0178738 A1* | 7/2011 | Rensing et al. | 702/56 |
| 2011/0192234 A1* | 8/2011 | Tombs | 73/861.355 |
| 2011/0259121 A1* | 10/2011 | Kolahi et al. | 73/861.355 |
| 2011/0277559 A1* | 11/2011 | Miyaji et al. | 73/861.355 |
| 2011/0308329 A1* | 12/2011 | Hagedoorn et al. | 73/861.355 |
| 2012/0073385 A1* | 3/2012 | Lanham et al. | 73/861.355 |

OTHER PUBLICATIONS

International Search Report, Jan. 17, 2013, The Netherlands.
English translation of the IPR, WIPO, Geneva, May 30, 2014.

\* cited by examiner

METHOD FOR MONITORING OSCILLATION CHARACTERISTICS IN A CORIOLIS, FLOW, MEASURING DEVICE

TECHNICAL FIELD

The present invention relates to a method for monitoring oscillation characteristics in a Coriolis, flow measuring device, which is insertable into a pipeline, wherein the Coriolis, flow measuring device has an oscillatory system excitable to execute mechanical oscillations, and wherein the oscillatory system has at least one measuring tube, through which a medium can flow. Furthermore, the present invention relates to a correspondingly embodied, Coriolis, flow measuring device.

BACKGROUND DISCUSSION

According to the Coriolis principle, there always acts on a moved mass, when in a system a rotational movement of the mass superimposes with a straight line movement of the mass directed at least partially perpendicularly to the rotational axis, an additional force referred to as the Coriolis force. This effect is utilized in known manner in Coriolis, flow measuring devices to determine, for example, a mass flow of a fluid flowing in a pipeline. Coriolis, flow measuring devices have, as a rule, one or more measuring tubes, wherein these, depending on device type, can be formed into different configurations. The system of the at least one measuring tube (and, in given cases, more add-on parts, such as counteroscillator arms, etc.) forms an oscillatory system, which, depending on measuring tube configuration, has corresponding natural oscillation modes, such as, for example, bending oscillations (fundamental mode as well as modes of higher order), torsional oscillations (fundamental mode as well as modes of higher order), etc.

For use, a Coriolis, flow measuring device is inserted into a fluid carrying pipeline in such a manner that the fluid flows through the at least one measuring tube. The fluid is, in such case, preferably formed by a liquid, which, depending on application, can have different viscosities and, in given cases, can entrain also solids and/or gas. For determining a mass flow of the fluid, the at least one measuring tube is excited by at least one exciter to execute oscillations. The at least one exciter can, in such case, be in the form of, for example, an electromechanical exciter, especially an electrodynamic exciter, which exerts on the measuring tube a force corresponding to a supplied exciter current. As a rule, the oscillatory system is excited to a resonant frequency of the same (for example, the fundamental mode of the bending oscillation). If fluid is not flowing through the at least one measuring tube, then the entire measuring tube oscillates in phase. If fluid is flowing through the at least one measuring tube, then a Coriolis force acts on the moved mass (of the fluid). This leads to the fact that the measuring tube is supplementally deformed due to the Coriolis force and a phase shift occurs along the direction of elongation of the respective measuring tube. The phase shift along a measuring tube can be registered by corresponding oscillation sensors, which can, in turn, be formed by electromechanical, especially electrodynamic, sensors and which are arranged spaced from one another along the direction of elongation of the measuring tube. The phase shift registrable via the oscillation sensors is proportional to the mass flow through the measuring tube.

Additionally or alternatively, Coriolis, flow measuring devices can also measure other physical variables, such as, for example, density or viscosity, of a fluid flowing in a pipeline.

In the case of density measurement, the principle is utilized that the resonant frequency (for example, of the fundamental mode of the bending oscillation) depends on the oscillating mass and therewith on the density of the fluid flowing through the at least one measuring tube. By adjusting the excitation frequency in such a manner that the oscillatory system is excited in its resonant frequency, the resonant frequency and therefrom, in turn, the density of the flowing fluid can be determined.

In the case of mass flow measurement as well as also generally in the case of measuring a physical measured variable of a fluid flowing through a Coriolis, flow measuring device, the physical measured variable to be determined, such as, for example, mass flow, density, viscosity, etc., of the flowing fluid is calculated, in each case, from at least one registered variable, such as, for example, at least one sensor voltage, and, in given cases, additional variables. Included in these calculations are, among other things, device-specific factors, which are determined, for example, earlier in the context of a calibration. Such device-specific factors can, however, change over time. Especially, there occurs in the case of many applications of Coriolis, flow measuring devices, over time, abrasion (especially in the case of particles entrained in the fluid), corrosion (especially in the case of aggressive media) and/or coating (especially in the case of media, which tend to form accretions) of the at least one measuring tube. The thereby related changes of the oscillatory behavior of the at least one measuring tube bring about a measurement error in the case of measuring a physical measured variable of a flowing fluid, especially in the case of mass flow measurement.

Desirable, in such case, is that such abrasion, corrosion and/or coating of the at least one measuring tube can be detected, without it being necessary to remove the Coriolis, flow measuring device from service or otherwise interfere with its operation in some substantial way. Furthermore, it is desirable that, for performing the diagnosis, measuring (especially of mass flow, density and/or viscosity) is not interrupted. This means that such diagnosis can also be performed continuously or regularly at predetermined time intervals. Moreover, it is desirable that no or only small additional energy consumption be required for performing the diagnosis.

Known are different diagnostic methods, by which the usual parameters $K_0$ and $Q$ for description of the oscillation characteristics of a Coriolis, oscillatory system are determinable. In such case, $K_0$ refers to the stiffness of the oscillatory system (especially of the at least one measuring tube and/or oscillatory arm, etc.), while $Q$ is the quality factor. An example of a known diagnostic method is that of determining the quality factor $Q$ from the resonant frequency $f_r$, from the frequency $f_{-45}$ for a phase shift of $-45°$ and from the frequency $f_{+45}$ for a phase shift of $+45°$, as in the following Equation (1):

$$Q = \frac{f_r}{f_{-45} - f_{+45}} \tag{1}$$

This known diagnostic method requires, however, a considerable time period, since, in each case, one must wait until the oscillatory system has tuned to the relevant frequencies. Furthermore, as a rule, the flow measurement must be interrupted during the performing of the diagnostic method.

Accordingly, there is in the case of known diagnostic methods a great need for improvement as regards the above named, desirable requirements.

SUMMARY OF THE INVENTION

An object of the present invention is to provide a method for monitoring oscillation characteristics of an oscillatory system of a Coriolis, flow measuring device and a correspondingly embodied Coriolis, flow measuring device, by which changes in the oscillation characteristics are reliably detectable and which is performable also parallel to flow measurement (especially measurement of mass flow, density and/or viscosity).

The object is achieved by a method provided for monitoring oscillation characteristics in a Coriolis, flow measuring device. The Coriolis, flow measuring device is insertable into a pipeline and includes an oscillatory system excitable to execute mechanical oscillations, wherein the oscillatory system has at least one measuring tube, through which a medium can flow. The method comprises steps as follows:

A) exciting the oscillatory system by at least one exciter to execute mechanical oscillations according to an excitation input signal, which has temporary signal modulations occurring in time intervals;
B) registering by sensor at least one response variable of the caused mechanical oscillations of the oscillatory system;
C) simulating the excited oscillatory system with a digital model, which has at least one fittable parameter, wherein the simulating comprises: Exciting the digital model in the same manner as the oscillatory system; calculating a simulation response variable of the simulated oscillations according to the digital model; and, performed over a plurality of signal modulations, iterative conforming of the at least one, fittable parameter in such a manner that the simulation response variable interatively approaches the response variable; and
D) ascertaining whether a corresponding limit value is exceeded by the at least one, interatively ascertained parameter value for the at least one, fittable parameter or by at least one variable derived from the at least one, interativeiy ascertained parameter value.

The, temporary signal modulations arising in time intervals in the excitation input signal cause both the real oscillatory system as well as also the digital model to react thereto. Based on a (suitably measurable) response variable (of the real oscillatory system) and a (suitably calculable) simulation response variable (of the digital model), these effects of the temporary signal modulations on the oscillatory system and on the digital model can be registered. Since the simulation response variable interatively approaches the response variable by the interative conforming of the at least one, fittable parameter, a parameter value for the at least one, fittable parameter can be interatively ascertained. The step of ascertaining then enables (e.g. by comparison with a parameter value present at initial start-up of the oscillatory system, by comparison with a comparison variable predetermined by the manufacturer, by performing a predetermined calculation with the interatively ascertained parameter value and comparing with a comparison variable, etc.) determining whether the at least one, interatively ascertained parameter value still lies within an allowable range or not. If results of the step of ascertaining show that operation is no longer within an allowable range, corresponding measures can be introduced. Such introduced measures can include, among others, the output of an indication that maintenance is needed, the output of an error report or an alarm, a corresponding correction of an output measured value, etc. Accordingly, the method of the invention reliably shows whether changes in the oscillation characteristics in a Coriolis, flow measuring device have occurred, especially changes caused by corrosion, abrasion and/or accretion on at least one measuring tube.

Since the excitation input signal has only temporary signal modulations occurring in time intervals, there is, due to the comparatively high time constant of the mechanical oscillations of the oscillatory system, no negative influencing of the flow measurement (for determining mass flow, density and/or viscosity of a flowing medium) by these temporary signal modulations. Accordingly, the method of the invention for monitoring oscillation characteristics can be performed in parallel with flow measurement. Flow measurement does not need to be interrupted. Especially, it can be provided that the method for monitoring oscillation characteristics is performed continuously in parallel with flow measurement or in predetermined (e.g. periodic) time intervals in parallel with flow measurement. Alternatively, it can also be provided that the method is performed only on demand, which is made, for example, by a user or by a superordinated control unit connected for communication with the Coriolis, flow measuring device. Furthermore, since the excitation input signal experiences only temporary signal modulations, the additional energy consumption required for performing the method of the invention is small.

In the following, in the cases, in which at least one exciter, oscillation sensor, measuring tube, parameter, response variable, etc., is provided, it will be not noted each time explicitly the opportunity for provision of a plurality of these components, or variables. Nevertheless, this opportunity is to be understood as a given herein.

The terminology "oscillatory system" refers to the part of the Coriolis, flow measuring device, which, in the use of the Coriolis, flow measuring device (for performing a flow measurement), is excited to execute oscillations. The oscillatory system can, in such case, be formed essentially of one measuring tube (with, in given cases, present, add-on parts), essentially two or more measuring tubes (with, in given cases, present, add-on parts), essentially at least one measuring tube and at least one (containing no flowing medium) oscillatory arm (with, in given cases, present, add-on parts), etc. The present method is, in such case, independent of the respectively excited oscillation mode (bending oscillation, torsional oscillation, etc.) and independent of the respective configuration of the at least one measuring tube (straight line, arc shaped, otherwise curved, one or more measuring tubes, etc.). Preferably, the oscillatory system is excited in the fundamental mode of the bending oscillation. Especially, the oscillatory system includes at least one exciter, by which the oscillatory system can be excited to execute mechanical oscillations, and at least one oscillation sensor, by which mechanical oscillations of the oscillatory system are registrable.

The terminology "excitation input signal" refers generally to a signal, which is characteristically used for exciting the oscillatory system. Especially, the excitation input signal is a signal fed to the at least one exciter directly or, in given cases, also in further processed form. On the basis of this signal, the at least one exciter exerts a force on the oscillatory system. The excitation input signal can be formed, for example, by an excitation voltage or excitation energy applied to the exciter, an excitation electrical current applied to the exciter or by an excitation force exerted by the exciter on the oscillatory system, etc. The terminology "response variable" refers, generally, to a variable, which is characteristic for the oscillations of the oscillatory system caused by the exciting. The response variable can be formed, for example, by the deflection distance of the oscillations of the oscillatory system, by a velocity of these oscillations, or by a sensor voltage proportional to the velocity of the oscillations, etc. In reference to the simulation based on the digital model, the variables defined above in reference to the real oscillatory system are correspondingly defined. An "exciting in the same manner" can especially be implemented in such a manner that the digital model is fed the same excitation input signal as the real oscillatory system. Alternatively, the digital model can also a be fed some other signal, by which in equal valued manner the exciting of the real oscillatory system can be simulated. Correspondingly, the terminology "simulation response variable" refers to a variable, which is characteristic for the simulated oscillations of the digital model caused by the excitation. The response variable and the simulation response variable can, in such case, be two equal or directly comparable, physical variables. This is, however, not absolutely necessary. Rather, it is also sufficient, when, for a comparison, or for the step of approximating, these are convertable into one another according to a predetermined rule.

The digital model is, in such case, embodied in such a manner that it can, by corresponding fitting of the at least one, fittable parameter, simulate the real oscillation system, at least to the extent that it provides, in the case of excitation, in the same manner, also a simulation response variable corresponding to the response variable. Especially, it can be provided that the digital model (in the case of corresponding fitting of the at least one, fittable parameter) identically simulates the real oscillatory system, this bringing the advantage that also the at least one, fittable parameter can be directly associated with, or directly correspond to, corresponding physical parameters defined in the case of the real oscillatory system. Such physical parameters, which characterize the real oscillatory system (and which can be correspondingly so provided also in the digital model) include especially the quality factor Q, the stiffness $K_0$ of the oscillatory system and the resonant frequency $\omega_r$ of the oscillatory system.

The terminology "temporary signal modulations" refers especially to signal modulations, whose duration is short compared with the period of the data rate, with which a measurement signal of the flow measurement is output (e.g. on a display of the Coriolis-flow measuring device, via a fieldbus, etc.). Typically, the data rate, with which a measurement signal of the flow measurement is output, lies in the range of 50 to 100 Hz (hertz). The duration of the signal modulation lies, for example, in the range of 0.01 to 0.05 times the duration of the period of the data rate, with which a measurement signal of the flow measurement is output. For example, the data rate of the output measured values amounts to 50 Hz, while the duration of the temporary signal modulation amounts, in each case, to 0.5 ms (ms: millisecond). The sampling rate, with which the (as a rule, analog) measurement signal of the at least one oscillation sensor is sampled, is, in contrast, clearly higher and amounts to a number of kilohertz (e.g. 40 kHz). Also, the digital processing of the so digitized measurement signal occurs within the Coriolis, flow measuring device, as a rule, with a correspondingly high frequency (e.g. 40 kHz) or with a frequency in this range.

Preferably, at least the step of simulating (step C)) and, in given cases, also the step of ascertaining (step D)) is/are performed by a correspondingly embodied electronics of the Coriolis, flow measuring device. This is advantageous especially in the case of the step of simulating, since the values of the response variable required for this can be directly accessed in the Coriolis, flow measuring device (at the respective position of the signal processing and therewith sufficiently high rate).

In the case of the step of simulating, the iterative conforming occurs especially in such a manner that, in each case; one starts with a beginning value for the at least one, fittable parameter of the digital model and, therewith, the first calculation is performed. Then, the value of the at least one, fittable parameter is changed according to a predetermined algorithm, such as, for example, LMS (Least Mean Square), RLS (Recursive Mean Square), etc., in such a manner that the simulation response variable approaches the response variable, or converges toward such. Which algorithm is well suited here depends also on the type of the signal modulations and the calculation resources present. In a further development, in the case of the step of ascertaining (step D)), that at least one parameter value of the respective fittable parameter is inserted (or used) as interatively ascertained parameter value, in the case of which the associated simulation response variable has converged toward the response variable to a predetermined minimum measure. Preferably (and, as a rule, this is the case) in the case of this fitting, also the particular parameter value of the at least one, fittable parameter converges in each case toward one value. Whether the simulation response variable is already sufficiently near (or converged toward) the response variable can especially be determined by means of a cost function, whose function value gives a variable to be minimized (e.g. magnitude of the separation or quadratic separation, etc., of the simulation response variable relative to the response variable).

In a further development, the temporary signal modulations of the excitation input signal are, in each case, formed by a temporary frequency- and/or amplitude change of the excitation input signal. Such a signal modulation is especially easily implementable.

Fundamentally, it is not compulsory that the temporary signal modulations occur periodically (i.e. in regular time intervals) in the excitation input signal. With regard to an easy performing of the simulation and calculations requiring as little processor power as possible, it is, however, preferred that the temporary signal modulations occur periodically in the excitation input signal. Furthermore, it is also preferred that the temporary signal modulations are very short relative to the period, within which they occur, (e.g. fraction amounting to 0.01 to 0.05). In this way, it is assured that, over a large part of the duration of the excitation input signal, an undisturbed excitation input signal is present, and, therewith, the flow measurement (for determining mass flow, density and/or viscosity of a flowing medium) is not noticeably influenced. In the present invention, it is, furthermore, not compulsory that the repeatedly arising, temporary signal modulations are, in each case, identical. Toward the goal of achieving an easy performance of the simulation and calculations requiring as little processor power as possible, it is, however, preferred that the signal modulations are formed, in each case, by using an identical signal curve.

In a further development, the temporary signal modulation's are, in each case, formed by a temporary amplitude change of the excitation input signal. A temporary amplitude change of the excitation input signal is easily carried out. Furthermore, it is advantageous as regards the parallelly performed simulation, because, in the case of such an exciting, the step response of the response variable can be examined. If the temporary amplitude change is a temporary lessening of the amplitude (e.g. to half), such is also advantageous for achieving an as small as possible energy consumption.

In a further development, the steps of exciting (step A)), registering by sensor (step B)), simulating (step C)) and ascertaining (step D)) are performed in parallel with (i.e., at the same time as) a flow measurement (for determining mass flow, density and/or viscosity of a flowing medium). In this way, the oscillation characteristics can be continuously monitored, or monitored in regular time intervals, during operation of the flow measuring device, without having to interrupt the flow measurement therefor.

In a further development, the response variable is formed by a velocity of the oscillation (i.e. the time rate of change of the deflection of the oscillatory system) and the simulation response variable by a velocity of the simulated oscillation. In the case of the real oscillatory system, the velocity of the oscillation is measurable directly by corresponding oscillation sensors, which, as a rule, output a sensor voltage corresponding to velocity. Accordingly, instead of the velocity of the oscillation of the real oscillatory system as well as of the digital model, in each case, also a corresponding sensor voltage, respectively simulated sensor voltage, can be used, wherein the conversion occurs simply, using a constant factor ($K_{sens}$). This relationship is not explicitly noted each time. Rather, reference can be made equally to the velocity of the oscillation, as well as also to the sensor voltage (both in the case of the real oscillatory system as well as also in the case of the digital model).

In a further development, the digital model of the excited oscillatory system is based on a transfer function H(s) of the following form:

$$H(s) = \frac{U_{sens}(s)}{I_{exc}(s)} = \frac{K_{exc}K_0 K_{sens} s}{1 + \frac{s}{\omega_r Q} + \frac{s^2}{\omega_r^2}}$$

wherein $U_{sens}(s)$ is a measured sensor voltage in the s domain and forms a response variable,
$I_{exc}(s)$ is an exciter current in the s domain and forms an excitation input signal,
$K_{exc}$ is a scaling factor giving the ratio of an exciter force $F_{exc}$ exerted on the oscillatory system to the exciter current $I_{exc}$ (i.e., $K_{exc}=F_{ex}/I_{exc}$),
$K_0$ is a stiffness of the oscillatory system,
$K_{sens}$ is a scaling factor giving the ratio of the measured sensor voltage $U_{sens}$ to the velocity of the oscillation $V_1$ (i.e., $K_{sens}=U_{sens}/V_1$),
$V_1(S)$ is the velocity of the oscillation in the s domain, and is proportional to the sensor voltage $U_{sens}$,
$s=j\omega$, wherein $\omega$ corresponds to the excitation frequency of the oscillatory system and $j^2=-1$,
$\omega_r$ is a resonant frequency of the respectively excited oscillation mode, and
Q is a quality factor, which describes the decay behavior of the oscillations of the oscillatory system in the case of a one time excitation.

This transfer function is generally applied in the field of the invention, in order to describe the oscillation response behavior of the oscillatory system of a Coriolis, flow measuring device. In general, a transfer function relates an input variable (here: excitation input signal) to an output variable (here: response variable). In general, "s" is called the Laplace variable. The above set forth relationship $s=j\omega$ is only for the harmonic case, i.e. when the oscillatory system is steady state. Such a steady state system can be assumed for the present invention. $U_{sens}(s)$, $I_{exc}(s)$ and $V_1(s)$ can, in each case, also have a complex part. The digital model does not, in such case, need to be embodied exactly according to this transfer function (i.e. does not have to correspond to an exact transformation of the transfer function into the z domain). Rather, (besides an exact transformation into the z domain) also reformulations, approximations and/or simplifications based on this transfer function can be performed. This understanding, that the digital model "is based" on a relevant physical relationship, forms the basis for the following further developments, in the case of which such a formulation is selected.

In a further development, the excitation input signal has a frequency, which essentially corresponds to the resonant frequency of the oscillatory system. In this way, considerable simplifications are possible, as will be explained below in detail. Especially, this leads to the fact that, in the time domain, the excitation input signal (for example, the exciter current) and the velocity of the oscillation (and, therewith, correspondingly the sensor voltage) are in phase. Furthermore, by excitation at the resonant frequency, a significant parameter describing the oscillatory system, namely the resonant frequency, can be directly ascertained. By a frequency "essentially" corresponding to the resonant frequency is meant, especially, that, among other things, temporary signal modulations, which can also be a frequency change, are possible. Especially, small fluctuations of the frequency can be brought about by the temporary signal modulations occurring in the excitation input signal, as well as also by a change of medium or by air bubbles, particles, etc., entrained in the medium.

In a further development, the digital model of the excited oscillatory system is based on a transfer function present in digital representation and the digital representation of the transfer function includes as a component at least the following function Hsens(z) derived from an amplitude model:

$$H_a(z) = \frac{A_{s1}^*(z)}{A_m(z)} = \frac{g(1-b)}{1 - bz^{-1}}$$

wherein $$g = \omega_r Q \lambda K_{exc} K_0 K_{sens},$$

$$\ln b = -\frac{\omega_r}{2Q} T,$$

$A_m(z)$ is an amplitude of the excitation input signal in the z domain as supplied to the digital model,
$A_{s1}*(z)$ is an output amplitude in the z domain as obtained by the digital model from
$A_m(z)$, $\lambda$ is a general scaling factor, and T is the period of the sampling.

A digital representation corresponds, in such case, to a representation in the z domain. The z domain is, as is generally known in the field of the invention, used for description of a discrete, as a rule, complex, signal in the frequency domain. In the case of the amplitude model, there enter into the transfer function in the case of excitation input variable (of the digital model) and in the case of simulation response variable (of the digital model), in each case, only their particular amplitudes, not, however, their phases. As will be explained below in further detail, the digital amplitude model can be applied, when the exciting occurs with the resonant frequency of the respective oscillatory system and accordingly the above explained, simplified phase relationship between excitation input signal and response variable is present. In this way, the required calculations for performing the simulation are significantly simplified.

In a further development, the digital model of the excited oscillatory system is based on a transfer function present in digital representation and the digital representation of the transfer function includes at least the following function $H_{lp}(z)$ as a component. In such case, the function $H_{lp}(z)$ provides a delay and a low-pass filtering, which occur in the case of the real, digital signal processing of the response variable:

$$H_{lp}(z) = \frac{a_{lp} \cdot z^{-del}}{1-(1-a_{lp}) \cdot z^{-1}}$$

wherein
$a_{lp}$ and $_{del}$ are constants, which are to be matched correspondingly to the performed, real digital signal processing of the response variable.

In a further development, in the case of the iterative approaching of the simulation response variable to the response variable (compare step C)), per iteration time interval, the amplitudes of the velocity of the oscillation and the velocity of the simulated oscillation present at at least two different points in time during the associated iteration time interval are used as operative comparison variables. Correspondingly, also the real sensor voltage and a simulated sensor voltage are options. Especially, in such case, at one of the two different time points, the amplitudes of the velocity of the oscillation and the velocity of the simulated oscillation are settled. An amplitude is settled when it has reached a largely constant value. Especially, the at least one other point in time is determined by when at least one of the amplitudes (of the real oscillatory system and/or of the digital model) passes at the relevant point in time through a minimum. Especially, in each case, the points in time, at which, on the one hand, the amplitude ascertainment occurs in the real oscillatory system, and the points in time, at which, on the other hand, the amplitude ascertainment occurs in the digital model, agree.

In a further development, the fittable parameters of the digital model are formed by the stiffness $K_0$ and the quality factor Q or by two variables derived from the stiffness $K_0$ and the quality factor Q. The third parameter required, as a rule, for description of an oscillatory system, and, therewith, also for determining the digital model, is the resonant frequency $\omega_r$. If the excitation occurs, however, as is above described, with the resonant frequency, then this parameter results directly from the excitation frequency.

The present invention relates, furthermore, to a Coriolis, flow measuring device, which is insertable into a pipeline, wherein the Coriolis, flow measuring device comprises: An oscillatory system excitable to execute mechanical oscillations and having at least one measuring tube, through which a medium can flow; and an electronics. The electronics is embodied in such a manner that it can operate at least one exciter of the Coriolis, flow measuring device and can evaluate a sensor signal of at least one oscillation sensor. In such case, the electronics, at least one exciter and at least one oscillation sensor are formed in such a manner that the oscillatory system is excitable by the at least one exciter to execute mechanical oscillations according to an excitation input signal, which has temporary signal modulations occurring in time intervals, at least one response variable of the caused mechanical oscillations of the oscillatory system is registrable by the at least one oscillation sensor, the electronics can simulate the excited oscillatory system with a digital model, which has at least one fittable parameter, wherein the simulating comprises: Exciting the digital model in the same manner as the oscillatory system; calculating a simulation response variable of the simulated oscillations according to the digital model; and performed over a plurality of signal modulations, iterative conforming of the at least one, fittable parameter in such a manner that the simulation response variable interatively approaches the response variable, and the electronics can ascertain whether a corresponding limit value is exceeded by the at least one, iteratively ascertained parameter value for the at least one, fittable parameter or by at least one variable derived therefrom.

The Coriolis, flow measuring device of the invention achieves essentially the above advantages explained in reference to the method of the invention. Furthermore, in the case of the Coriolis, flow measuring device of the invention, essentially the same further developments and variants are options in corresponding manner, as explained above in reference to the method of the invention. As a rule, the respective steps can be implemented by corresponding adapting of the electronics (and, in given cases, the components connected therewith).

BRIEF DESCRIPTION OF THE DRAWINGS

Other advantages and utilities of the invention will become evident based on the following description of examples of embodiments with reference to the appended drawing, the figures of which show as follows.

DETAILED DISCUSSION IN CONJUNCTION WITH THE DRAWINGS

Figure 1:
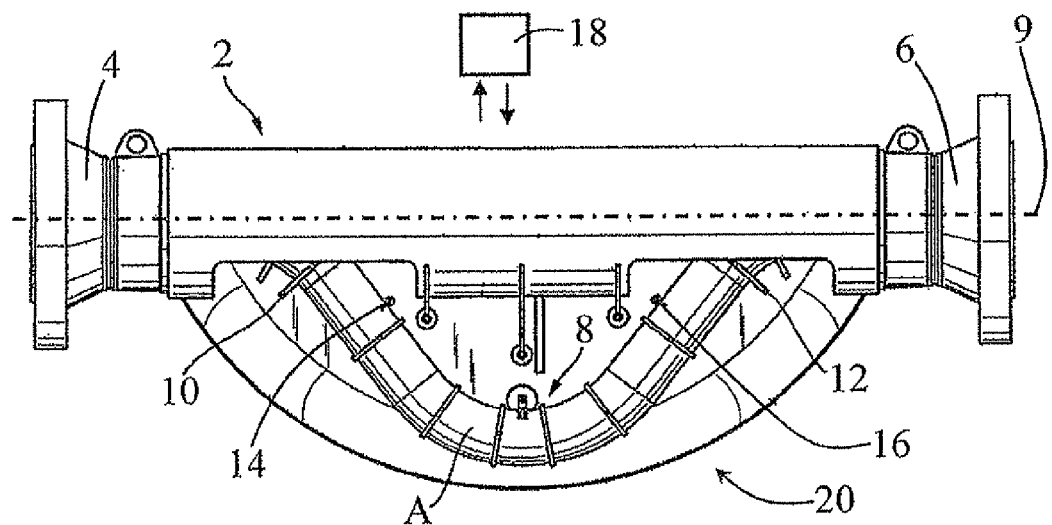
FIG. 1 in side view with partially removed housing, is a representation, by way of example, of a Coriolis, flow measuring device having two measuring tubes.
Figure 2:
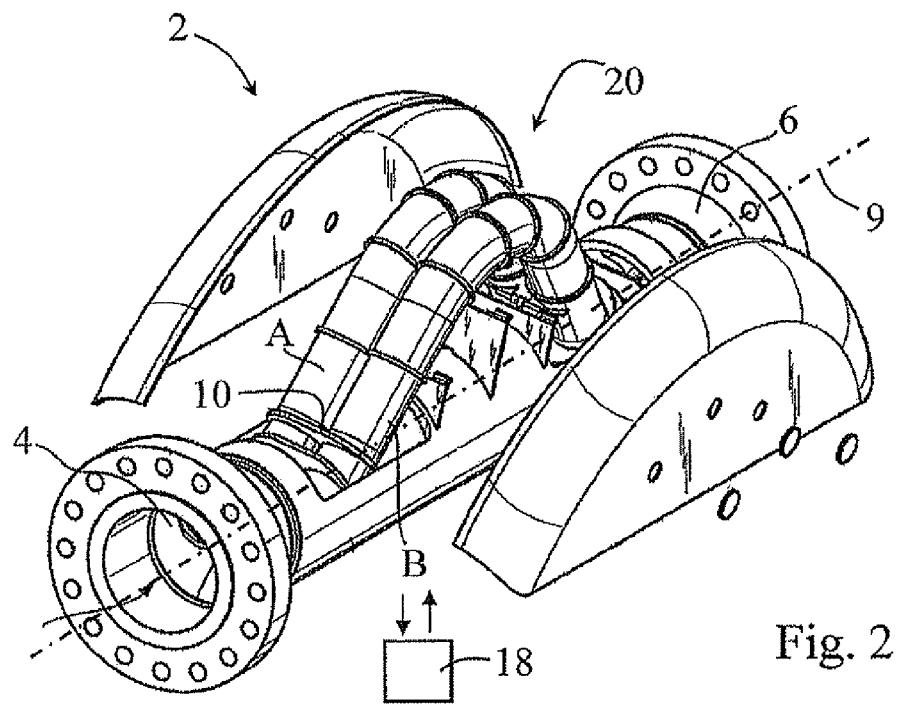
FIG. 2 in perspective view with partially removed housing, shows the Coriolis, flow measuring device of FIG. 1.

FIGS. 1 and 2 show, by way of example, a Coriolis, flow measuring device 2, which is suitable for application of the present invention. The Coriolis, flow measuring device 2 includes two oscillatably held, measuring tubes A and B, which are embodied curved and extend parallel with one another. The Coriolis, flow measuring device 2 is, in such case, insertable into a pipeline (not shown) in such a manner that the fluid flowing in the pipeline flows through both measuring tubes A and B. For this, the Coriolis, flow measuring device 2 includes, input side, a flow divider 4, by which the fluid is divided to flow into the two measuring tubes A and B. On the output side, in corresponding manner, a flow divider 6 is provided, by which the fluid leaving the two measuring tubes A and B is brought back together and led to an outlet of the Coriolis, flow measuring device 2.

Extending between the two measuring tubes A and B is an exciter 8, which in the present example of an embodiment is formed by an electrodynamic exciter 8. Exciter 8 is in the case of the present example of an embodiment arranged at a peak of the arc formed, in each case, by the two measuring tubes A and B. Exciter 8 is embodied in such a manner that, when supplied with an exciter current, i.e. the excitation input variable, its length changes. Thus, by supplying a corresponding, periodic, exciter current to the exciter 8, the two measuring tubes A and B can be periodically pushed apart and/or drawn together, such that they execute bending oscillations. In such case, the two measuring tubes A and B are excited with opposite phase relative to one another and execute, in each case, a swinging movement about a longitudinal axis 9 of the Coriolis, flow measuring device 2. The two measuring tubes A and B are, furthermore, mechanically coupled to one another on the input side and on the output side by corresponding coupling elements 10, 12.

Between the two measuring tubes A and B, in each case, on an inlet side and on an outlet side section of such, extend two oscillation sensors 14, 16. Length changes of the two oscillation sensors 14, 16 effect registration of the mechanical oscillations of the two measuring tubes A and B. In the present example of an embodiment, the two oscillation sensors 14, 16 register, in each case, the separation change per unit time between the two measuring tubes A, B, i.e. the velocity of the oscillation, measured here based on the combined amplitudes of the measuring tubes A and B. The oscillation sensors 14, 16 are formed, for example, by electrodynamic sensors. The oscillation sensors 14, 16 yield, as a function of the velocity of the oscillation, in each case, a sensor voltage, which forms a response variable of the caused oscillations. For measuring mass flow, among other things, a phase shift of the oscillations of the measuring tubes A, B along the direction of elongation of the two measuring tubes A, B can be registered via the two oscillation sensors 14, 16 and, therefrom, the mass flow calculated.

The exciting of the exciter 8 by supplying a corresponding exciter current as well as the evaluation of the sensor voltage (or, in general, the measurement signal) provided by the oscillation sensors 14, 16 occurs by a correspondingly embodied electronics 18, which is represented in FIGS. 1 and 2 only schematically, by a box. Especially, electronics 18 is embodied in such a manner that, by it, an exciting of the oscillatory system 20, which includes the two measuring tubes A, B, is controllable in such a manner that the oscillatory system 20 is excited to a resonant frequency of the fundamental mode of the bending oscillation. Such a control of the excitation frequency can occur, for example, based on an evaluation of at least one measurement signal of the oscillation sensors 14, 16. Especially, such a control can occur in such a manner that the excitation input signal and the response variable representing a velocity of the oscillation and registered by sensor are in phase, i.e. have a phase shift of 0.

In the following, first, the derivation of a digital model will be described generally. Then, in the context of an example of an embodiment of the invention, a special, digital model and the ascertaining of the fittable parameter will be described based on the same.

Figure 3:
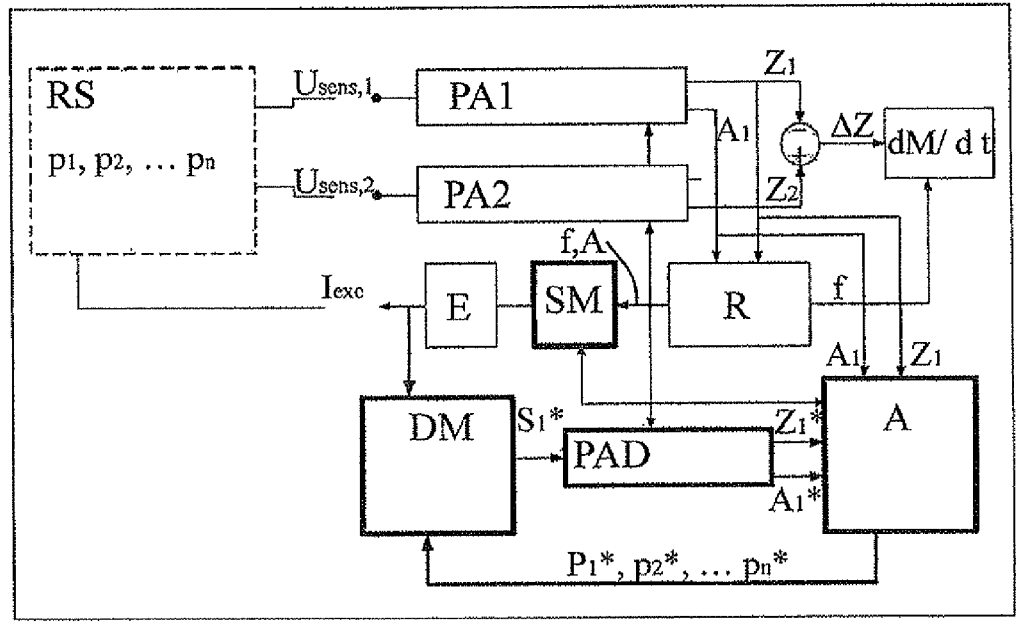
FIG. 3 is a schematic representation for illustrating the signal processing according to the method of the invention.

The schematic representation shown in FIG. 3 serves for illustrating the signal processing performed according to the method of the invention. First, the signal processing generally known in the field of the invention and performed in a Coriolis, flow measuring device will be explained. The oscillation response behavior of the real oscillatory system RS is characterized by a number of parameters $p_1, p_2, \ldots p_n$. The exciting of the real oscillatory system RS occurs on the basis of the exciter current $I_{exc}$. As was explained above, there are, as a rule, provided on a Coriolis, flow measuring device at least two oscillation sensors, which are spaced relative to one another along the flow direction. The signal paths of the sensor voltages $U_0$ and $U_{sens,2}$ output by the two oscillation sensors are shown in the upper part of FIG. 3. These firstly analog variables are sampled with a high sampling rate (e.g. 40 kHz) and digitally processed. Through this processing, which is represented on the signal path of the first sensor by the block PA1 and on the signal path of the second sensor by the block PA2, in each case, the phases $Z_1$ and $Z_2$ of the two signals as well as at least the amplitude of one signal $A_1$ (here from the first oscillation sensor) are ascertained. From the phases $Z_1$ and $Z_2$ of the two signals, then their phase difference $\Delta Z$ is ascertained. For ascertaining the phase difference $\Delta Z$, the data rate is significantly reduced, for example, to a data rate of 50 Hz or 100 Hz (Hz: hertz), which brings with it a time delay of the output measured value as well as a low pass behavior. From the frequency f of the oscillations and the phase difference $\Delta Z$, the mass flow (mass per unit time) is calculated, this being schematically indicated in FIG. 3 by the block dM/dt. Furthermore, from the amplitude $A_1$ and the phase $Z_1$ of at least one signal (present from the first oscillation sensor) according to a corresponding control algorithm, a frequency and an amplitude are ascertained for exciting the oscillatory system, this being schematically indicated in FIG. 3 by the block R. Corresponding to these specifications, then a corresponding exciter current $I_{exc}$ is determined, this being schematically represented by the block E.

In addition to the known signal processing explained above, it is provided according to the invention that temporary signal modulations occurring in time intervals are introduced into the excitation input signal (here: in the exciter current $I_{exc}$), this being indicated schematically in FIG. 3 by the block SM. Furthermore, the excitation input signal (here: the exciter current $I_{exc}$) is fed not only to the real oscillatory system RS but also to the digital model provided according to the present invention, this being indicated in FIG. 3 by the block DM. The output $S_1^*$ of the digital model DM is processed (demodulated) in the block PAD exactly in the same manner as the output $U_{sens,1}$ of the real oscillatory system RS (here: the first oscillation sensor) and its amplitude $A_1^*$ and its phase $Z_1^*$ ascertained. The obtained signals (A1, Z1) of the real oscillatory system RS as well as the signals (A1\*, Z1\*) of the digital model DM are then used, in order to fit fittable parameters $p_1^*, p_2^*, \ldots p_n^*$, which characterize the digital model DM, in such a manner that the signals $(A_1^*, Z_1^*)$ of the digital model DM converge toward the corresponding signals $(A_1, Z_1)$ of the real oscillatory system RS. This fitting, which is represented schematically in FIG. 3 by the block A, occurs interatively (according to a corresponding fitting algorithm), wherein, in each iteration, the correspondingly fitted parameters $p_1^*, p_2^*, \ldots p_n^*$ are fed to the digital model DM, in order to be used in the next iteration for processing the exciter current $I_{exc}$ for producing the output $S_1^*$. In the context of this iterative fitting, as already described above, suitable fitting algorithms (e.g. LMS, RLS, etc.) are applied, by which the fittable parameters $p_1^*, p_2^*, \ldots p_n^*$ are changed in each iteration in such a manner that the signals $(A_1^*, Z_1^*)$ of the digital model DM converge toward the corresponding signals (A1, Z1) of the real oscillatory system RS. The checking, whether a sufficient convergence is present, can be determined especially by means of a cost function, whose function value gives the variable to be minimized (e.g. magnitude of the separation or quadratic separation, etc., of the simulation response variable, especially the signals ($A_1^*$, $Z_1^*$), compared with the response variable, especially the signals ($A_1$, $Z_1$)). If the signals have converged, then it is ascertained, from the iteratively ascertained parameter values of the fittable parameters $p1^*$, $p_2^*$, ... $p_n^*$ of the digital model, whether these still lie within an allowable range.

As known from systems theory, there are different options for the fitting algorithm, according to which the fittable parameters $p1^*$, $p_2^*$, ... $p_n^*$ of the digital model are interatively fitted. Furthermore, there are also different options as to how the digital model is described mathematically.

In the following, a first form of embodiment of the present invention will now be explained. In such case, a transfer function, which is usually used in the field of flow measurement for description of the real oscillatory system of a Coriolis, flow measuring device, will be used to derive a corresponding, digital model, on the basis of which the above described calculations are performable in the context of simulations. The applied transfer function is based, in such case, on a resonator model with one degree of freedom, which is estimated to second order. The transfer function H(s) in the s domain (s: Laplace index, which, especially in the harmonic case, corresponds to jω) is given in Equation (2), wherein the above definitions are referenced for the therein arising variables. In the case of following derivation, the parameters $K_0$, $\omega_r$ and $Q$ of the real oscillatory system are applied, which correspond to the fittable parameters $K_0^*$, $\omega_r^*$ and $Q^*$ of the digital model. Accordingly, after derivation of the digital model, the parameters $K_0$, $\omega_r$ and $Q$ can be replaced by the parameters $K_0^*$, $\omega_r^*$ and $Q^*$ and the fitting of such can occur interatively in the context of the simulation, in order so to ascertain the actual parameter values of the parameters $K_0$, $\omega_r$ and $Q$ of the real oscillatory system.

$$H(s) = \frac{U_{sens}(s)}{I_{exc}(s)} = \frac{K_{exc}K_0 K_{sens} s}{1 + \frac{s}{\omega_r Q} + \frac{s^2}{\omega_r^2}} \quad (2)$$

Figure 4:
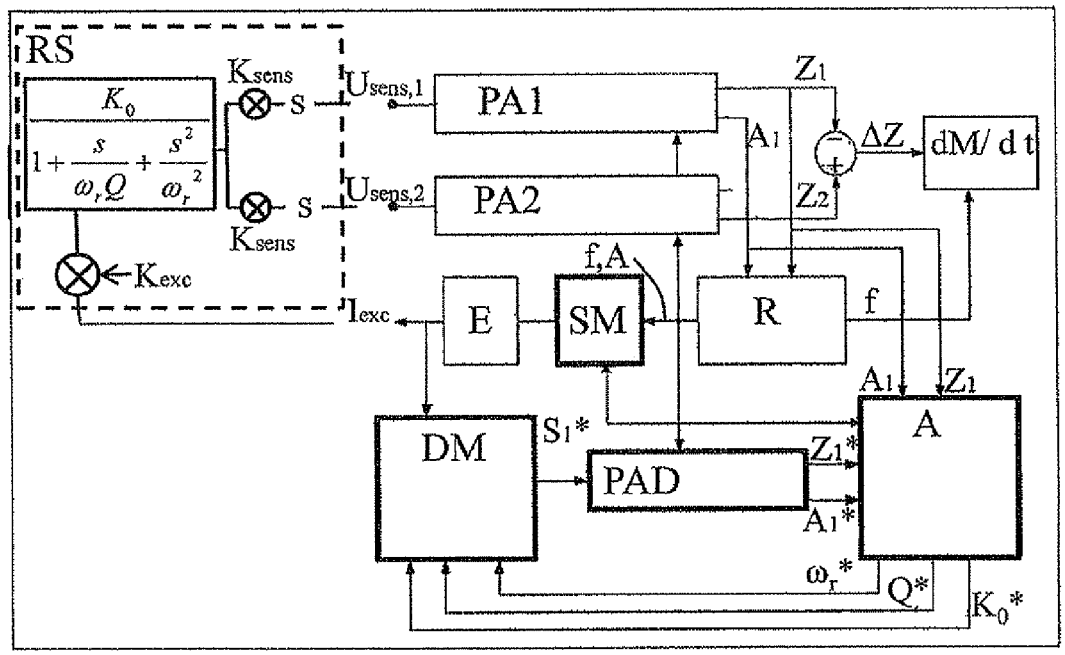
FIG. 4 is a schematic representation for illustrating the signal processing according to a first form of embodiment of the method of the invention.

In such case, the part $$\frac{K_0}{1 + \frac{s}{\omega_r Q} + \frac{s^2}{\omega_r^2}}$$

gives the ratio of the deflection of the oscillatory system for the exciter force $F_{exc}$, wherein the product of the deflection of the oscillation system and the variable s gives, in turn, the velocity V1 of the oscillation of the oscillatory system (in the s domain). FIG. 4 is a signal representation representing the first form of embodiment. FIG. 4 largely corresponds to the representation shown in FIG. 3. Accordingly, the same reference characters are used and only the differences compared with FIG. 3 are explored. FIG. 4 especially makes concrete the transfer function H(s) according to the first form of embodiment in the real system RS. As clear from the transfer function H(s), the (real) parameters $p_1$, $p_2$, ... $p_n$ characterizing the real system RS are the stiffness $K_0$, the resonant frequency $\omega_r$ and the quality factor Q. Correspondingly, according to the first form of embodiment, selected as the fittable parameters $p_1^*$, $p_2^*$, ... $p_n^*$ of the digital model DM are a stiffness $K_0^*$, a resonant frequency $\omega_r^*$ and a quality factor $Q^*$, which are defined corresponding to the real parameters.

From this transfer function, as known in systems theory, a digital model in the z domain can be derived by means of a frequency predistortion, which is given in the relationship (3), and by means of a bilinear transformation, which is given in the relationship (4). In such case, $F_s$ is the sampling frequency in the relationships (3) and (4).

$$\omega_r \to 2F_s \tan\frac{\omega_r}{2F_s} \quad (3)$$

$$s \to 2F_s \frac{1-z^{-1}}{1+z^{-1}} \quad (4)$$

The thereby obtained, digital model H(z), which is formed by the transfer function in the z domain, has the form shown in Equation (5):

$$H(z) = \frac{K_z(1+z^{-1})^2}{p_z + 2q_z z^{-1} + r_z z^{-2}} \quad (5)$$

wherein the following relationships (6)-(12) hold:

$$K_z = K_0 K_{exc} K_{sens} \quad (6)$$

$$p_z = 1 + \frac{c_z}{a_z b_z} + \frac{c_z^2}{b_z^2} \quad (7)$$

$$q_z = 1 - \frac{c_z^2}{b_z^2} \quad (8)$$

$$r_z = 1 - \frac{c_z}{a_z b_z} + \frac{c_z^2}{b_z^2} \quad (9)$$

$$a_z = Q \quad (10)$$

$$b_z = 2F_s \tan\left(\frac{\omega_r}{2F_s}\right) \quad (11)$$

$$c_z = 2F_s \quad (12)$$

Figure 5:
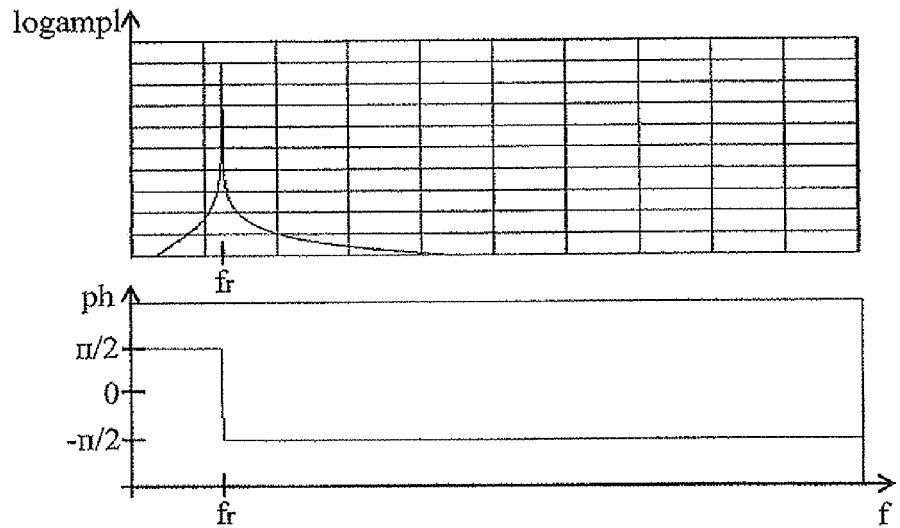
FIG. 5 shows Bode-diagrams for illustrating amplitude transfer and phase transfer of the transfer function of the first form of embodiment.

An established way of representating phase transfer and amplitude transfer of the transfer function H(s) in the s domain, or the transfer function H(z) in the z domain, is Bode diagrams, as shown in FIG. 5. In such case, in the upper diagram of FIG. 5, the logarithm of the amplitude of the sensor voltage $U_{sens}$ (and, therewith, correspondingly the velocity V1 of the oscillation) is plotted versus frequency f. The two axes in the upper diagram are not scaled, in order to illustrate the curve only schematically. As is evident, the curve has a maximum at the resonant frequency $f_r$. Plotted in the lower diagram of FIG. 5 is the phase shift, in radiens, of the sensor voltage $U_{sens}$ (and, therewith, correspondingly the velocity V1 of the oscillation) relative to the exciter current $I_{exc}$, versus frequency, wherein the frequency axis, again, is not scaled. As is evident, the phase shift for frequencies smaller than the resonant frequency fr is 0.5 n, in the case of resonant frequency fr the phase shift is 0 (i.e. in phase) and in the case of frequencies greater than the resonant frequency the phase shift is −0.5 n.

Fundamentally, based on the transfer function H(z) in the z domain according to Equation (5) in the context of simulations, the fittable parameters $K_0^*$, $\omega_r^*$ and $Q^*$, which, in each case, are inserted into the Equations (5) to (12) for the parameters $K_0$, $\omega_r$ and $Q$ in the above Equations (5) to (12), can be fitted iteratively in such a manner that the signals $(A_1^*, Z_1^*)$ of the digital model DM converge toward the corresponding signals $(A_1, Z_1)$ of the real oscillation system RS. The values obtained for the fittable parameters $K_0^*$, $\omega_r^*$ and $Q^*$ of the digital model correspond then to the associated, actually present parameters $K_0$, $\omega_r$ and $Q$ of the real oscillatory system. The performing of the calculations required for this is relatively complex and requires calculating at a high rate, which assumes a relatively high processor power.

In the following, a second form of embodiment will now be explained, in the case of which, starting from the transfer function H(s) according to Equation (2), simplifying boundary conditions and approximations are made. In this way, the calculations to be performed in the context of the simulation are simplified and the rate of the calculations can be reduced, so that a smaller processor power is required. In such case, in the following derivation, again, the parameters $K_0$, $\omega_r$ and $Q$ of the real oscillatory system are applied, which correspond to the fittable parameters $K_0^*$, $\omega_r^*$ and $Q^*$ of the digital model. Accordingly, after derivation of the digital model, the parameters $K_0$, $\omega_r$ and $Q$ can be replaced by the parameters $K_0^*$, $\omega_r^*$ and $Q^*$ and the fitting of such can occur interatively in the context of the simulation, in order so to ascertain the actual parameter values of the parameters $K0$, $\omega_r$ and $Q$ of the real oscillatory system.

In the case of the second form of embodiment, on the one hand, it is assumed that the oscillatory system oscillates constantly at the resonant frequency $\omega_r$. As is known in the field of the invention, this is usual in the case of performing a flow measurement (for example, for determining mass flow, density, and/or viscosity) and a corresponding control algorithm is provided in the Coriolis, flow measuring device, by which the tuning of the excitation of the oscillatory system to the resonant frequency occurs. Accordingly, the resonant frequency $\omega_r$ (and, therewith, also the corresponding parameter $\omega_r^*$ of the digital model) results directly from the frequency of the excitation (e.g. of the exciter current $I_{exc}$), or from the frequency of the sensor voltage $U_{sens}$ (or, the velocity V1 of the oscillation) having the same phase as the excitation current. Especially, the time average value of this frequency can be taken as the resonant frequency $\omega_r$, so that short time, small fluctuations are omitted. Additionally, an algorithm can be implemented in electronics, by which is monitored, whether short time, relatively high frequency changes occur, which can be caused, for example, by solids entrained in the medium, by air bubbles entrained in the medium, etc. In the case of occurrence of such temporary, high frequency changes, especially, the performing of the method of the invention can be temporarily interrupted. Accordingly, in the second form of embodiment, only the quality factor Q and the stiffness $K_0$ of the real oscillatory system must be ascertained by simulations.

Another simplification in the case of excitation of the oscillatory system at its resonant frequency $\omega_r$ results from the fact that the time-dependent exciter current $I_{exc}(t)$ and the time-dependent sensor voltage $U_{sens}(t)$ (and accordingly the velocity of the oscillation $V_1(t)$) are in phase. Accordingly, as is presented in the following, a simplified, digital model can be derived from an amplitude model, in which only the (time-dependent) amplitudes enter and the phase of the relevant variables (especially the exciter current $I_{exc}(t)$ and the sensor voltage $U_{sens}(t)$) are left out. Furthermore, as is subsequently presented, the ascertaining of phase and amplitude of the output (demodulation) obtained from the digital model, can, as is represented in FIGS. 3 and 4 schematically by the block PAD, be described simply by a low-pass filter with a predetermined delay. In this way, calculation is provided at a clearly lower rate.

In the following, it is shown that the amplitude model can be applied in the case of excitation at the resonant frequency $\omega_r$. The excitation input signal is, in the context of this second form of embodiment, formed by the time-dependent exciter current $I_{exc}(t)$, which is described by a sinusoidal oscillation with variable amplitude $A_a(t)$ ($A_a(t)$: real valued), as in the following Equation (13):

$$I_{exc}(t)=A_a(t)e^{j\omega t} \text{ with } \omega \approx \omega_r \tag{13}$$

The response variable, which in the case of the second form of embodiment is formed by the time-dependent sensor voltage $U_{sens}(t)$, can—since it is in phase with the exciter current $I_{exc}(t)$—be described by a sinusoidal oscillation with variable amplitude $B_a(t)$ ($B_a(t)$: real valued) and phase equal to the exciter current $I_{exc}(t)$, as is given in Equation (14):

$$U_{sens}(t)=B_a(t)e^{j\omega t} \text{ with } \omega \approx \omega_r \tag{14}$$

The transfer function H(s) in the s domain according to Equation (2) can be transformed into the following Equation (15):

$$\left(1+\frac{s}{\omega_r Q}+\frac{s^2}{\omega_r^2}\right)U_{sens}(s)=K_{exc}K_0 K_{sens}sI_{exc}(s) \tag{15}$$

Multiplication with s in the s domain corresponds, in the case of a steady state system (such a harmonic case is assumed here) in the time domain to a derivative with respect to time. Accordingly, Equation (15) corresponds in the time domain to the following differential Equation (16), wherein the small points over the variables means derivative with respect to time, two points thus meaning the second derivative with respect to time.

$$\left(U_{sens}(t)+\frac{\dot{U}_{sens}(t)}{\omega_r Q}+\frac{\ddot{U}_{sens}(t)}{\omega_r^2}\right)=K_{exc}K_0 K_{sens}\dot{I}_{exc}(t) \tag{16}$$

For achieving a clearer representation, temporarily the product of $K_{exc}$, $K_0$ and $K_{sens}$ is set equal to 1, so that Equation (17) results. Further below, these variables are reinserted, wherein the fundamental reformulations are mathematically correct and the temporary omitting occurs only for achieving a clearer presentation.

$$\left(U_{sens}(t)+\frac{\dot{U}_{sens}(t)}{\omega_r Q}+\frac{\ddot{U}_{sens}(t)}{\omega_r^2}\right)=\dot{I}_{exc}(t) \tag{17}$$

Used for the time derivatives, $\dot{I}_{exc}(t)$, $\dot{U}_{sens}(t)$ and $\ddot{U}_{sens}(t)$, are the relationships set forth in Equations (18), (19), and (20), which result from the time serivatives of the Equations (13), and (14):

$$\dot{I}_{exc}(t)=\dot{A}_a(t)e^{j\omega t}+j\omega A_a(t)e^{j\omega t} \tag{18}$$

$$\dot{U}_{sens}(t)=\dot{B}_a(t)e^{j\omega t}+j\omega B_a(t)e^{j\omega t} \tag{19}$$

$$\ddot{U}_{sens}(t)=\ddot{B}_a(t)e^{j\omega t}+2j\omega\dot{B}_a(t)e^{j\omega t}-B_a(t)\omega^2 e^{j\omega t} \tag{20}$$

If the relationships (18), (19) and (20) are substituted into Equation (17) and the term $e^{j\omega t}$ divided out, then the following Equation (21) is obtained:

$$B_a(t) + \frac{\dot{B}_a(t) + j\omega B_a(t)}{\omega_r Q} + \frac{\ddot{B}_a(t) + 2j\omega \dot{B}_a(t) - B_a(t)\omega^2}{\omega_r^2} = \dot{A}_a(t) + j\omega A_a(t) \quad (21)$$

A bringing together of the imaginary and the real terms in Equation (21) results in the following Equation (22):

$$B_a(t) + \frac{\dot{B}_a(t)}{\omega_r Q} + \frac{\ddot{B}_a(t) - B_a(t)\omega^2}{\omega_r^2} + j\omega\left(\frac{B_a(t)}{\omega_r Q} + \frac{2\dot{B}_a(t)}{\omega_r^2}\right) = \dot{A}_a(t) + j\omega A_a(t) \quad (22)$$

Comparison of the imaginary terms of Equation (22) results in the following Equation (23):

$$\frac{B_a(t)}{\omega_r Q} + \frac{2\dot{B}_a(t)}{\omega_r^2} = A_a(t) \quad (23)$$

Equation (23) in the time domain, converted into the s domain, yields Equation (24), wherein, again, a derivative with respect to time in the time domain corresponds to a multiplication with s in the s domain (also here the harmonic case of a steady state, oscillatory system is assumed):

$$\frac{B_a(s)}{\omega_r Q} + \frac{2sB_a(s)}{\omega_r^2} = \left(\frac{1}{\omega_r Q} + \frac{2s}{\omega_r^2}\right) B_a(s) = A_a(s) \quad (24)$$

Proceeding from Equation (24), a transfer function $H_a(s)$ can be established in the s domain based on amplitude, as set forth in the following Equation (25):

$$H_a(s) = \frac{B_a(s)}{A_a(s)} = \frac{\frac{\omega_r^2}{2}}{\frac{\omega_r}{2Q} + s} \quad (25)$$

In the case of the second form of embodiment, the temporary signal modulations are formed by temporary amplitude changes of the exciter current (or, generally, of the excitation input signal). Especially, these temporary amplitude changes in the case of the second form of embodiment are composed of a temporary reduction of the amplitude by half, before they then return to the normal value. In the case of ascertaining the digital representation of the transfer function $H_a(s)$ based on the amplitude, in view of this type of signal modulation, the main emphasis is especially placed on having the step response to such amplitude changes be correctly reflected. In such case, it generally holds that a general transfer function $H_{gen}(s)$ of first order of the form given in Equation (26) (in the s domain) has a step response $B_{gen}(t)$ of the form shown in Equation (27) (in the time domain), wherein $a_{gen}$ and $b_{gen}$, in each case, are constants (this relationship is generally known in the field of the invention). By comparison of the general transfer function $H_{gen}(s)$ according to Equation (26) with the transfer function $H_a(s)$ based on amplitude according to Equation (25), there results for $a_{gen}$ the relationship set forth in Equation (28), for $b_{gen}$ the relationship set forth in Equation (29) and accordingly for the step response $B_{gen}(t)$ the relationship set forth in Equation (30).

$$H_{gen}(s) = \frac{a_{gen}}{b_{gen} + s} \quad (26)$$

$$B_{gen}(t) = \frac{a_{gen}}{b_{gen}}(1 - e^{-b_{gen}t}) \quad (27)$$

$$a_{gen} = \frac{\omega_r^2}{2} \quad (28)$$

$$b_{gen} = \frac{\omega_r}{2Q} \quad (29)$$

$$B_{gen}(t) = \omega_r Q\left(1 - e^{-\frac{t\omega_r}{2Q}}\right) \quad (30)$$

On the other hand, it holds in the z domain that a digital filter $H_a(z)$ of the form set forth in Equation (31) (in the z domain) has a step response comparable to Equation (30), wherein the step response $N_a(t)$ of the digital filter $H_a(z)$ is given in Equation (32) (this relationship is known in the field of the invention). In such case, g and b are constants.

$$H_a(z) = g\frac{(1-b)}{1 - bz^{-1}} \quad (31)$$

$$N_a(t) = g\left(1 - e^{\frac{\ln b}{T}t}\right) \quad (32)$$

Due to the comparable step responses $B_{gen}(t)$ and $N_a(t)$, the transfer function $H_a(s)$ of Equation (25) can be described by the digital filter $H_a(z)$ given in Equation (31). The supplementally to be performed fitting due to a time delay arising in the case of real signal processing and lowpass filtering (in the case of demodulation) are still to be supplementally taken into consideration, as is described below. By comparison of the step responses $B_{gen}(t)$ (according to Equation (30)) and $N_a(t)$ (according to Equation (32)), the constants g and b can be ascertained. Therefrom results, for the digital representation $H_a(z)$ of the transfer function $H_a(s)$ shown in Equation (25), the relationship set forth in Equation (33) (recursive structure of first order), wherein T stands for the sampling period:

$$H_a(z) = g\frac{(1-b)}{1 - bz^{-1}}, \quad (33)$$

wherein $$g = \omega_r Q$$

and $$\ln b = -\frac{\omega_r}{2Q}T$$

If, supplementally, the above constants $K_{exc}$, $K_0$ and $K_{sens}$ temporarily neglected after Equation (16) and an additional scaling factor A are brought back in, then there results for the factor g from Equation (33) the following relationship of Equation (34):

$$g = \omega_r Q \lambda K_{exc} K_0 K_{sens} \quad (34)$$

In such case, it is to be taken into consideration that the magnitude of lnb is relatively small (compare Equation (33)), since Q, as a rule, is >100 and T is relatively small. Accordingly, b can be expressed approximately by 1-a, wherein 0<a<<1 and, furthermore, the approximation lnb=−a can be applied. With these approximations, there results the following relationship of Equation (35):

$$H_a(z) = \frac{A_{s1}*(z)}{A_m(z)} = \frac{ga}{1-(1-a)z^{-1}}, \quad (35)$$

wherein $$g = \omega_r Q \lambda K_{exc} K_0 K_{sens}$$

and $$a = \frac{\omega_r}{2Q} T$$

In Equation (35), $A_{s1}*$ refers to the output amplitude from the digital model and $A_m$ is the amplitude of the exciter current $I_{exc}$, which is fed to the digitalen model. As subsequently will still be explained in detail, the parameters g and a can, as fittable parameters of the digital model, be fitted interatively in the context of the simulation performed according to step C), until the system converges. From a, then the parameter value of the parameter $Q*$ can be ascertained and then from g the parameter value of the parameter $K0*$, wherein the asterisk means that the fittable parameters of the digital model are involved. Since these correspond to the real parameters Q and $K_0$ of the real oscillatory system, they can be directly replaced for one another in the relevant equations.

Figure 6:
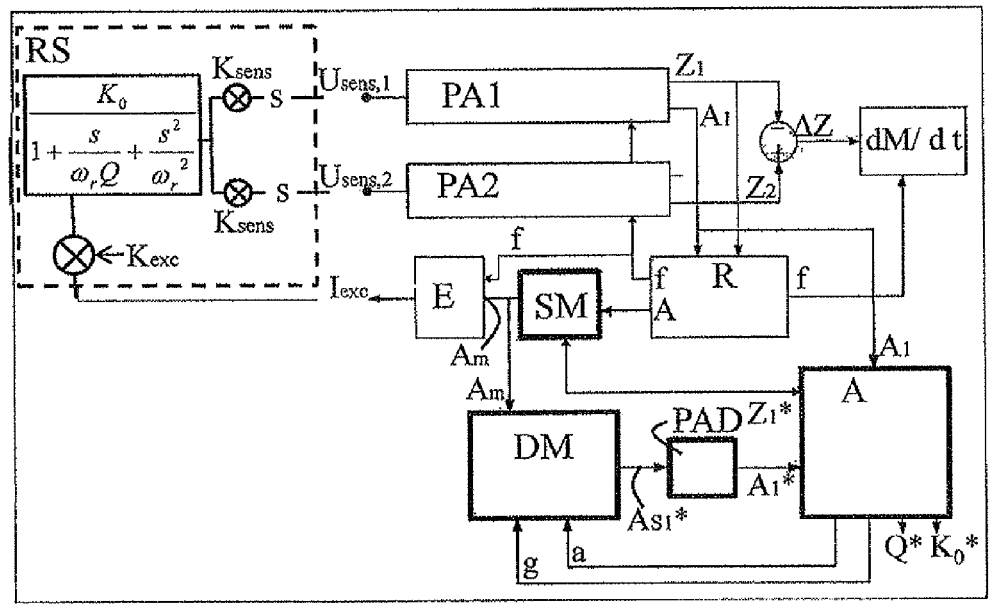
FIG. 6 is a schematic representation for illustrating the signal processing according to a second form of embodiment of the method of the invention.

FIG. 6 shows schematically the signal processing according to the second form of embodiment. The differences relative to the first form of embodiment will be explained. Again in the block R, a corresponding control algorithm is used to ascertain, from the amplitude $A_1$ and phase $Z_1$ of at least one signal (here, from the first oscillation sensor), a frequency f and an amplitude A for exciting the oscillatory system. The ascertained frequency f is directly fed to the block E, within which a corresponding exciter current $I_{exc}$ is generated. Solely the ascertained amplitude A is fed to the block SM, within which temporary changes of the amplitude (here a temporary reduction to half of the usual value) are carried out. The therefrom obtained amplitude signal $A_m$ of the exciter current $I_{exc}$, which corresponds, as a rule, to the amplitude of the actual exciter current $I_{exc}$, is fed not only to the block E for generating an exciter current $I_{exc}$, but also to the digital model DM. The amplitude $A_{s1}*$ output from the digital model is processed (demodulated) in the block PAD correspondingly as the output $U_{sens,1}$ of the real oscillatory system RS (here, of the first oscillation sensor), wherein here only its amplitude $A_1*$ is ascertained. In the demodulation in the block PAD, there results, in the case of the second form of embodiment, a simplifying, namely that the demodulation performed in the real signal processing—when it is performed exclusively relative to the amplitude—can be represented simply by a delay and a lowpass characteristic. This additional part of the total transfer function, which describes the digital signal processing, is derived below. The variable, which is output from the block PAD (i.e. after the demodulation), is in the form of the demodulated amplitude $A_1*$. The amplitude $A_1$ of the real oscillatory system as well as the demodulated amplitude $A_1*$ of the digital model are then used, in order to fit the fittable parameters a, g, which characterize the digital model DM, in such a manner that the amplitude $A_1*$ of the digital model converges toward the amplitude $A_1$ of the real oscillatory system. This fitting, which is represented in FIG. 6 schematically by the block A, occurs interatively. In such case, in each iteration, the correspondingly fitted parameters a, g are fed to the digital model DM, in order in the next iteration of the processing of the amplitude signal $A_m$, which is fed to the digital model DM, to be used for producing the amplitude $A_{s1}*$ output from the digital model. An example of such an iterative fitting is described below. In the case of each iteration of a, g, also corresponding values for the quality factor $Q*$ and the stiffness $K_0*$ of the digital model DM are ascertainable from the values of the parameters a, g, as is represented in FIG. 6 schematically by the two further outputs from the block A. If the system has converged, then the values for the quality factor $Q*$ and the stiffness $K_0*$ of the digital model DM correspond to the values of the quality factor Q and the stiffness $K_0$ of the real oscillatory system.

In the following, a digital representation $H_{lp}(z)$ is derived, which describes the delay and lowpass characteristic occurring in the case of demodulation in the context of the real signal processing. Here, a recursive structure of first order with a delay is applied, even though, basically, also other representations are possible. The digital representation $K_p(z)$ of a transfer function in the z domain is given in Equation (36), wherein this gives—with reference to FIG. 6—the ratio of the demodulated amplitude $A_1*$ to the output amplitude $A_{sj}*$ emanating from the digital model DM (in each case, in the z domain). In such case, the parameters $a_{lp}$ and $_{del}$ in Equation (36) are constants, which are to be fitted once corresponding to the delay and lowpass characteristic arising in the case of the real signal processing (respectively, demodulation) and then can be applied as constants. The constant $_{del}$ especially describes the delay, while $a_{lp}$ especially fits the lowpass characteristic.

$$H_{lp}(z) = \frac{A_1(z)^*}{A_{s1}^*(z)} = \frac{a_{lp} z^{-del}}{1-(1-a_{lp})z^{-1}} \quad (36)$$

From the two transfer functions according to Equation (35) and Equation (36) there results the digital representation of the total transfer function $H_{a,tot}(z)$ in the z domain according to Equation (37), by which the entire, real signal processing (with reference to the real oscillatory system) is describable and by which is given, accordingly with reference to the digital representation, the ratio between the demodulated amplitude $A_1*$ of the digital model and the amplitude signal $A_m$ supplied to the digital model DM (in each case, in the z domain). As was already explained above in reference to Equation (35), the parameters a, g form the parameters to be fitted interatively.

$$H_{a,ges}(z) = \frac{A_1(z)^*}{A_m(z)} = H_a(z) H_{lp}(z) = \frac{ga}{1-(1-a)z^{-1}} \frac{a_{lp} z^{-del}}{1-(1-a_{lp})z^{-1}} \quad (37)$$

Figure 7:
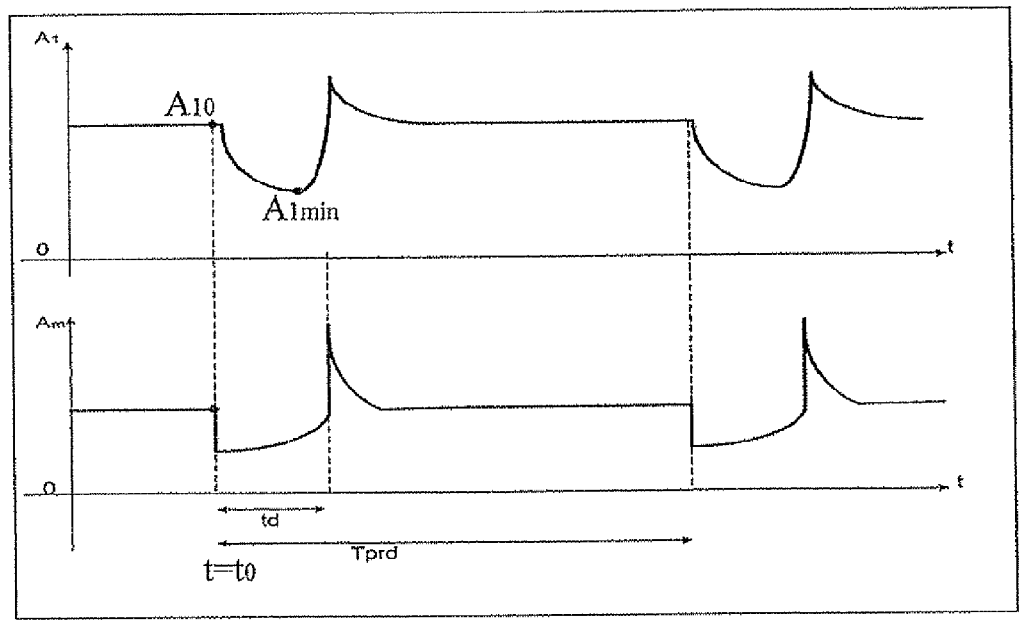
FIG. 7 is a schematic representation for illustrating the temporary signal modulations and their effects in the case of the real oscillation system.

In the following, based on the second form of embodiment, the temporary signal modulations as well as the fitting of the fittable parameters a, g are explained. In the case of the second form of embodiment, the temporary signal modulations are formed by reducing the amplitude $A_m$ to half for a short duration $t_d$, wherein this reducing is performed, in each case, in the same manner (i.e. with, in each case, equal signal curves) periodically with the period $T_{prd}$. The duration $t_d$ is, in such case, much smaller than the period $T_{prd}$, in order to prevent an influencing of the flow measurement, so that $t_d \ll T_{prd}$. These signal modulations of the amplitude $A_m$ are presented schematically (not true to scale) in the lower curve of FIG. 7, wherein, in each case, the amplitude $A_m$ (respectively $A_1$ in the upper curve of FIG. 7) is plotted as a function of time. For better illustrating the signal curve, in FIG. 7, the duration $I_d$ relative to $T_{prd}$ is clearly longer than in the case of actual implementation. As evident from the upper curve of FIG. 7, due to the signal modulation, also the amplitude $A_1$ of the real oscillatory system changes. Especially, it falls from a settled value $A_{10}$ (at a point in time $t=t_0$) with the beginning of the reduction of the amplitude $A_m$, likewise continuously, passes a minimum $A_{1min}$, and then swings back up to the starting value $A_{10}$. Additionally, there occurs, as known in the field of the invention, in each case, an overshooting, as is also shown in FIG. 7. These described signal modulations are especially advantageous, since—as will be explained below—the two fittable parameters a, g can be fitted and brought to convergence largely independently of one another.

Figure 8:
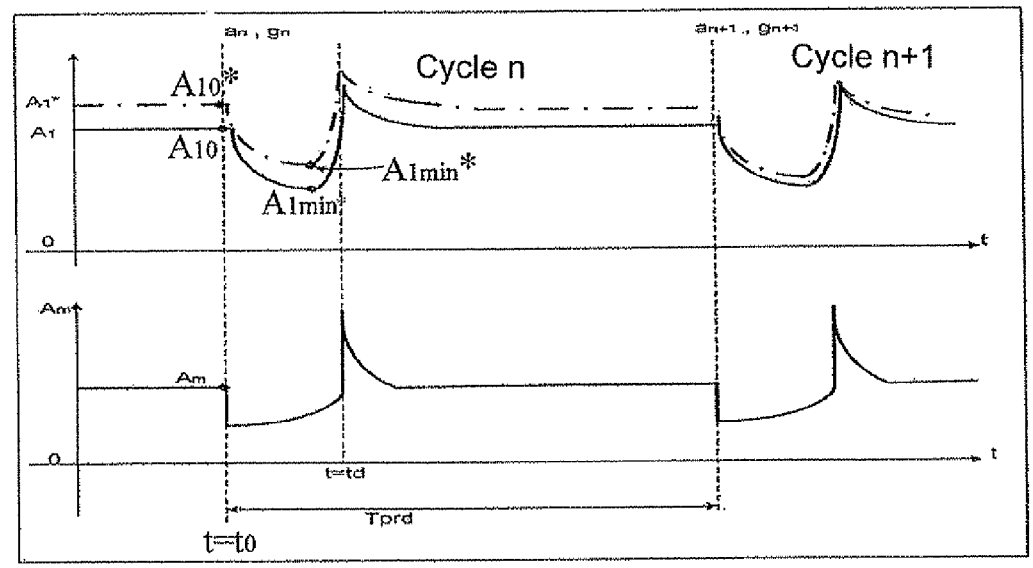
FIG. 8 is a representation corresponding to FIG. 7, wherein supplementally the curve of the amplitude of the digital model is presented.

In the following, it will now be explained, how the parameters a, g are interatively fitted (over the individual cycles) in such a manner that the demodulated amplitude $A_1^*$ of the digital model converges toward the amplitude $A_1$ of the real oscillatory system. This is schematically shown in FIG. 8, wherein the representation largely corresponds to that of FIG. 7 and supplementally includes in the upper diagram the demodulated amplitude $A_1^*$ of the digital model (dot dashed). As shown in FIG. 8, also the demodulated amplitude $A1^*$ includes correspondingly a settled value $A_{10}^*$ (for the point in time $t=t_0$) and passes through a minimum $A_{1min}^*$ (at an essentially same point in time as the demodulated amplitude $A_1$ of the real oscillatory system). As already explained above, in such case, it is assumed that the frequency f approximately corresponds constantly to the resonant frequency $f_r$, so that exclusively the amplitudes $A_1$ and $A_1^*$ can be considered in performing the iterations. For comparison of the amplitudes $A_1$ and $A_1^*$, in each cycle, in each case, only two values of the respective curves of $A_1$ and $A_1^*$ in the relevant cycle are taken into consideration, namely the settled value $A_{10}$, or $A_{10}^*$ (especially the values, in each case, present at the paint in time $t_0$) and the value of the minimum $A_{1min}$, or $A_{1min}^*$ (which, especially, in each case, are registered at equal points in time). These two values are indicated in FIG. 8 for the cycle n. The choice of these two values for the comparison is especially advantageous, since the parameter a has no, or only a negligible, influence on the settled value $A_{10}$, respectively $A_{10}^*$, so that the parameter g can be fitted based on the settled value largely independently of (or orthogonally to) the parameter a. This relationship arises especially from the step response $N_a(t)$ according to Equation (32), when large times are inserted for t, since the function of the step response then converges toward g.

Figure 9:
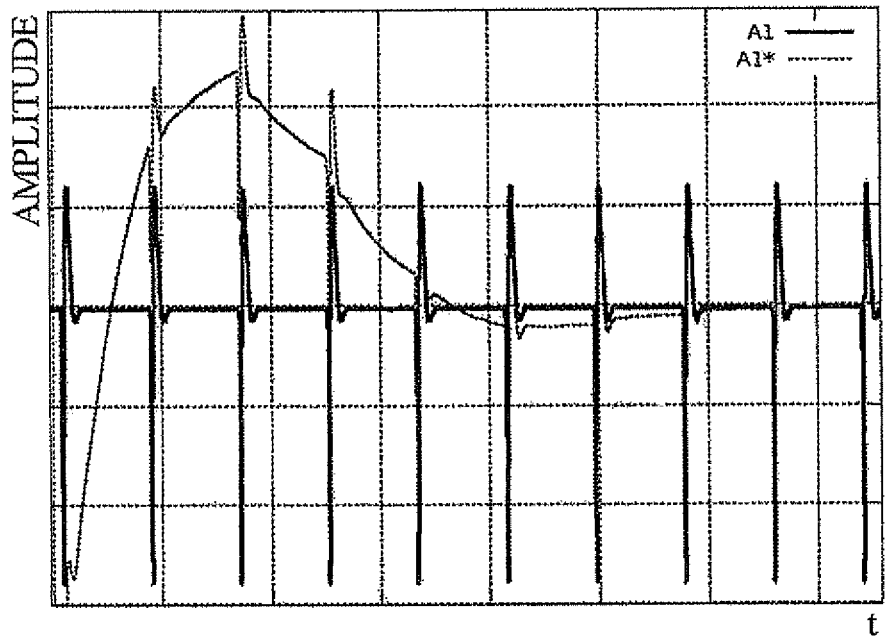
FIG. 9 is a schematic representation for illustrating the convergence of the amplitude of the digital model toward the amplitude of the real oscillatory system.
Figure 11:
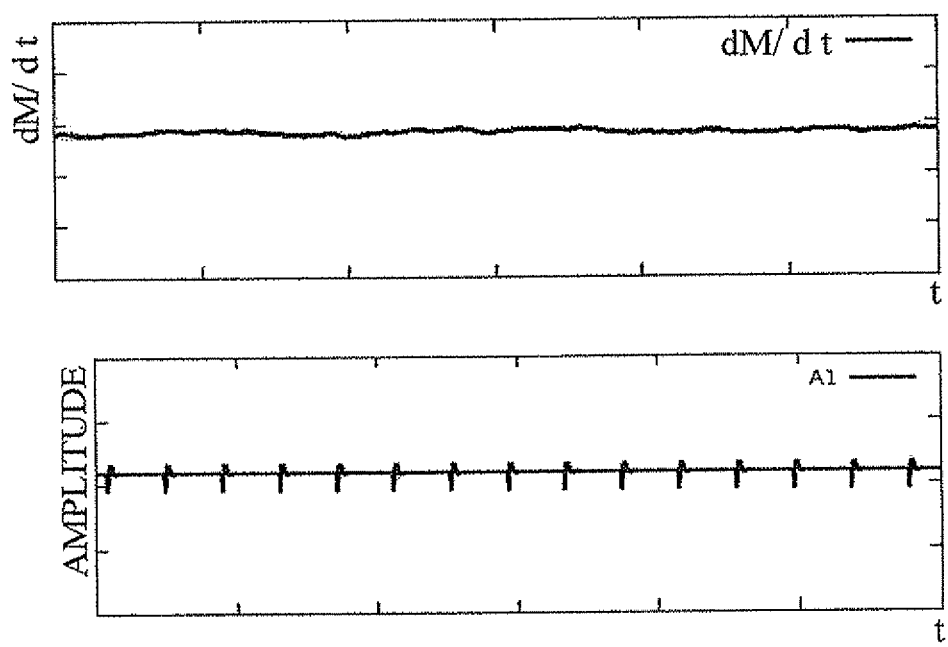
FIG. 11 is a schematic representation for illustrating the effect of the temporary signal modulations on a mass flow measurement.

FIG. 8 shows the cycle n centrally drawn. The duration of the cycle n corresponds to the period $T_{prd}$. Directly following the cycle n is then the cycle n+1 with the same period $T_{prd}$. During the cycle n, the parameter values for a and g obtained from the preceding cycle (n−1) are applied. These are referred to with $a_n$ and $g_n$. During the cycle n, in turn, the parameter values $a_{n+1}$ and $g_{n+1}$ to be used for the next cycle (n+1) are calculated according to a fitting algorithm. The ascertaining of the parameter values of the fittable parameters to be used for the next cycle occurs according to a fitting algorithm, which is explained below in detail. FIG. 8 also shows how the demodulated amplitude $A_1^*$ of the digital model converges toward the amplitude $A_1$ of the real oscillatory system over the cycles due to the iterative fitting of the parameters a, g. This convergence is shown in FIG. 9 for a smaller (and, therewith, nearer to practice) ratio of $t_d$ to $T_{prd}$, wherein FIG. 9 shows amplitude plotted as a function of time. In FIG. 9, the demodulated amplitude $A_1^*$ of the digital model is shown as a dashed line, while the amplitude $A_1$ of the real oscillatory system is represented by a solid line. The simulation illustrated in FIG. 11 shows that the mass flow measurement (for determining mass flow rate dM/dt), which is represented in the upper curve of FIG. 11, is not influenced by the temporary amplitude changes occurring in the real oscillatory system and shown in the lower curve of FIG. 11. In such case, there is plotted in the upper curve of FIG. 11 mass flow dM/dt as a function of time t, as ascertained by simulations of measured mass flow, while the lower curve of FIG. 11 shows the amplitude $A_1$ of the real oscillatory system as a function of time t, also as ascertained by simulations.

Used in the present form of embodiment as fitting algorithm is an LMS-based algorithm, wherein—as is explained below in detail—a (largely) scaling-independent representation is used. The general form of a LMS-based algorithm is given in Equation (38) generally for a parameter p, wherein $p_{n+1}$ is the value to be used for the cycle n+1 and $p_n$ is the value of the parameter p to be used for the cycle n.

$$p_{n+1} = p_n - \mu \frac{\partial [E(e_n^2)]}{\partial p} \quad (38)$$

In such case, $e_n$ is the error occurring in the cycle n, which results from the difference between the output of the digital model $y_n$ and the real output $y_{realn}$ ($e_n = y_{realn} - y_n$) during the cycle n. The symbol p stands for the convergence gain, wherein $0 < \mu < 1$, while $E(e_n^2)$ is the expectation value of the quadratic error. This is ascertained, as a rule, from an averaging of the errors obtained in the case of a plurality of preceding cycles. Both the calculating of the expectation value as well as also the taking of its derivative with respect to the parameter p are relatively difficult and complex to calculate, so that the expectation value in the field of the invention is relatively frequently replaced by the quadratic error, as in the following Equation (39):

$$\frac{\partial [E(e_n^2)]}{\partial p} \rightarrow \frac{\partial [e_n^2]}{\partial p} = 2 \cdot e_n \cdot \frac{\partial [e_n]}{\partial p} = -2 \cdot e_n \cdot \frac{\partial [y_n]}{\partial p} \quad (39)$$

In this last step of transformation in Equation (39), it is to be taken into consideration that the real output $y_{realn}$ does not depend on the parameter p of the digital model. By inserting Equation (39) into Equation (38), the following Equation (40) is obtained, wherein $\psi_n$ stands for the gradient during the cycle n:

$$p_{n+1} = p_n + 2\mu \cdot e_n \cdot \psi_n, \quad (40)$$

wherein:

$$\psi_n = \frac{\partial y_n}{\partial p} \bigg| p = p_n$$

In the case of the present form of embodiment, the two parameters a, g are fitted using the fitting algorithm set forth in Equation (40). Additionally, a scaling-independent representation is used, in order (in spite of the actually arising, high fluctuations of the amplitude) to be able to use a constant value for the parameter p.

The fitting of the parameter g will now be explained. The scaling occurs, in such case, by division by the value of the amplitude $A_m$ of the amplitude signal, which is fed to the digitalen model DM. Calculation of the error $e_n$ for cycle n is done with the following Equation (41), wherein the amplitude values $A_1$ and $A_1^*$ for the point in time $t_0$ of the cycle n (referred to in Equation (41) as $t_{0,n}$) are applied, which for $A_1$ and $A_1^*$ means, thus, the respective settled values $A_{10}$ and $A_{10}^*$.

$$e_n := \frac{A_1 - A_1^*}{A_m} \bigg| t = t_{0,n} \tag{41}$$

For estimating the gradient $\omega_n$, again, the step response $N_a(t)$ according to Equation (32) is considered, which converges toward g in the case of large times, (and, therewith, for the here used, settled values). As a result, $g_n$ can be calculated simply from the settled value of the demodulated amplitude $A1^*$ of the digital model, wherein, supplementally, due to the scaling explained above, a normalization with $A_m$ has to occur. Accordingly, the following Equation (42) results:

$$g_n = \frac{A_1^*}{A_m} \bigg| t = t_{0,n}; \tag{42}$$

as well as $$\psi_n = 1.$$

The gradient $\psi_n$ is accordingly constant and can (with corresponding fitting of the convergence gain p, which then is referred to as $\mu_g$) be set equal to 1, as given above in Equation (42). Therefrom there results for the parameter g the following fitting algorithm, wherein the speed of the convergence is determined by $\mu_g$:

$$g_{n+1} = g_n + 2\mu_g \cdot e_n, \text{ wherein } 0 < \mu g < 1 \tag{43}$$

In the following, the fitting of the parameter a will now be explained. The scaling occurs, in such case, by division by the difference of $A_{10}$ (settled value of the amplitude of the real oscillatory system) minus $A_{1min}$ (minimum value of the amplitude of the real oscillatory system). For the fitting of the parameter a, in each case, the minimum values of the amplitude curves of $A_1$ and $A_1^*$ are used, which are referred to, in each case, with $A_{1min}$ and $A_{1min}^*$. Accordingly, there results, in reference to the fitting of a, for the error $e_n$ in the case of cycle n the relationship given in Equation (44):

$$e_n := \frac{A_{1min} - A_{1min}^*}{A_{10} - A_{1min}} \tag{44}$$

For estimating the gradient $\psi_n$, the derivative of the error $e_n$ with respect to the parameter a is approximated by a term of first order. Furthermore, as evident from the following Equation (45), the scaling factors are neglected in the case of approximating the derivative and a corresponding fitting of the convergence gain p is performed, which is then referred to as $\mu_a$. In the case of forming the derivative, it is to be taken into consideration that the amplitude $A_{1min}$ of the real oscillatory system does not depend on the parameter a of the digital model and, thus, only the derivative of $-A_{1min}^*$, with respect to a, need be formed (wherein for $A_{1min}^*$ the minimum value for the cycle n is applied). Accordingly, the derivative of the error $e_n$ with respect to the parameter a can be expressed approximately by $-a_n$, as can be seen from the following Equation (45). If the thus obtained relationships are inserted into Equation (40), then there is obtained as fitting algorithm for the parameter a Equation (46), wherein $\mu_a$ determines the speed of the convergence:

$$\frac{\partial [e_n]}{\partial a} = \frac{\partial [-A_{1min}^*]}{\partial a} \approx -a_n \tag{45}$$

$$a_{n+1} = a_n(1 - 2\mu_a \cdot e_n) \tag{46}$$

wherein $$0 < \mu a < 1$$

Accordingly, the parameter g can be fitted according to the fitting algorithm of Equation (43) and the parameter a according to the fitting algorithm of Equation (46), wherein the values of such, in each case, converge toward a corresponding parameter value. From the parameter values a and g, then, in each case, the parameter values for the quality factor $Q^*$ of the digital model and the stiffness $K_0^*$ of the digital model can be ascertained based on the following relationships, which were already derived above:

$$Q^* = \frac{\omega_r}{2a} \cdot T \tag{47}$$

$$g = \omega_r \cdot Q^* \cdot \lambda \cdot K_{exc} \cdot K_0^* \cdot K_{sens} \tag{48}$$

Figure 10:
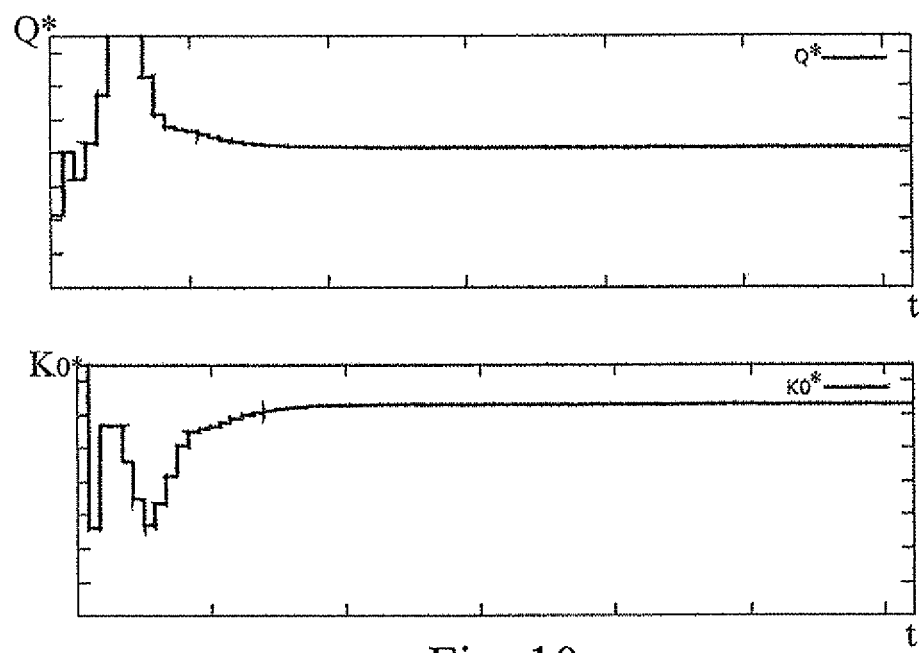
FIG. 10 is a schematic representation illustrating the convergence of the parameter values for the parameters Q* and $K_0$* of the digital model.

In the case of the present form of embodiment, the converged parameter values for $Q^*$ and $K_0^*$ of the digital model equal the corresponding parameters Q and $K_0$ of the real oscillatory system. Accordingly, in this way, the parameters Q and $K_0$ characterizing the real oscillation system can then be monitored as to whether these significantly deviate from beginning values (e.g. parameter values present at start-up of the Coriolis, flow measuring device) or from desired values. FIG. 10 shows schematically (the scaling here is not relevant) the convergence of the parameters $Q^*$ and $K_0^*$ as a function of time, wherein the upper graph shows the parameter $Q^*$ and the lower graph the parameter $K0^*$.

The invention claimed is:

1. A method for monitoring oscillation characteristics in a Coriolis, flow measuring device, which is insertable into a pipeline, said Coriolis, flow measuring device including an oscillatory system excitable to execute mechanical oscillations, wherein the oscillatory system has at least one measuring tube, through which a medium can flow, said method comprising:
   exciting the oscillatory system by at least one exciter to execute mechanical oscillations according to an excitation input signal, which exhibits temporary signal modulations occurring in time intervals;
   registering by sensor at least one response variable of the caused mechanical oscillations of the oscillatory system;
   simulating the excited oscillatory system with a digital model, which includes at least one fittable parameter; and
   ascertaining whether a corresponding limit value is exceeded by the at least one, interatively ascertained parameter value for the at least one, fittable parameter or by at least one variable derived from the at least one, interatively ascertained parameter value;
   wherein said simulating the excited oscillatory system with a digital model includes:

exciting the digital model in the same manner as the oscillatory system;

calculating a simulation response variable of the simulateoscillations according to the digital model; and, performed over a plurality of signal modulations, iterative conforming of the at least one, fittable parameter in such a manner that the simulation response variable iteratively approaches the response variable.

2. The method as claimed in claim 1, wherein:
in the step of ascertaining, that at least one parameter value of the respective fittable parameter is applied as interatively ascertained parameter value, in the case of which the associated simulation response variable has converged toward the response variable to a predetermined minimum measure.

3. The method as claimed in claim 1, wherein:
the temporary signal modulations of the excitation input signal are, in each case, formed by a temporary frequency- and/or amplitude change of the excitation input signal.

4. The method as claimed in claim 1, wherein:
the temporary signal modulations occur periodically in the excitation input signal.

5. The method as claimed in claim 1, wherein:
the temporary signal modulations are, in each case, formed by a temporary amplitude change of the excitation input signal.

6. The method as claimed in claim 1, wherein:
the steps of exciting, registering by sensor, simulating and ascertaining are performed in parallel with a flow measurement.

7. The method as claimed in claim 1, wherein:
the response variable is formed by a velocity of the oscillation and the simulation response variable by a velocity of the simulated oscillation.

8. The method as claimed in claim 1, wherein:
the digital model of the excited oscillatory system is based on a transfer function of the following form:

$$H(s) = \frac{U_{sens}(s)}{I_{exc}(s)} = \frac{K_{exc}K_0 K_{sens} s}{1 + \frac{s}{\omega_r Q} + \frac{s^2}{\omega_r^2}}$$

wherein $U_{sens}$ is a measured sensor voltage in the s domain and forms a response variable, $I_{exc}(s)$ is an exciter current in the s domain and forms an excitation input signal, $K_{exc}$ is a scaling factor giving the ratio of an exciter force $F_{exc}$ exerted on the oscillatory system to the exciter current $I_{exc}$ (i.e., $K_{exc}=F_{exc}/I_{exc}$), $K_0$ is a stiffness of the oscillatory system, $K_{sens}$ is a scaling factor giving the ratio of the measured sensor voltage $U_{sens}$ to the velocity of the oscillation $V_1$ (i.e., $K_{sens}=U_{sens}/V_1$), $V_1(s)$ is the velocity of the oscillation in the s domain, and is proportional to the sensor voltage $U_{sens}$, $s=j\omega$, wherein $\omega$ corresponds to the excitation frequency of the oscillatory system and $j^2=-1$, $\omega_r$ is a resonant frequency of the respectively excited oscillation mode, and Q is a quality factor, which describes the decay behavior of the oscillations of the oscillatory system (20) in the case of a one time excitation.

9. The method as claimed in claim 1, wherein:
the excitation input signal has a frequency, which essentially corresponds to the resonant frequency of the oscillatory system.

10. The method as claimed in claim 9, wherein:
the digital model of the excited oscillatory system is based on a transfer function present in digital representation and the digital representation of the transfer function includes as a component at least the following function Hsens(z) derived from an amplitude model:

$$H_a(z) = \frac{A_{s1}^*(z)}{A_m(z)} = \frac{g(1-b)}{1-bz^{-1}} =$$

wherein $$g = \omega_r Q \lambda K_{exc} K_0 K_{sens},$$

$$\ln b = -\frac{\omega_r}{2Q} T,$$

$A_m(z)$ is an amplitude of the excitation input signal in the z domain as supplied to the digital model, $A_{s1}*(z)$ is an output amplitude in the z domain as obtained by the digital model from $A_m(z)$, λ a general scaling factor is, and T is the period of the sampling (sampling).

11. The method as claimed in claim 1, wherein:
the digital model of the excited oscillatory system is based on a transfer function present in digital representation and the digital representation of the transfer function includes at least the following function $H_{lp}(z)$ as a component, wherein the function $H_{lp}(z)$ provides a delay and a low-pass filtering, which occur in the case of real, digital signal processing of the response variable:

$$H_{lp}(z) = \frac{a_{lp} \cdot z^{-del}}{1 - (1-a_{lp}) \cdot z^{-1}}$$

wherein $a_{lp}$ and $_{del}$ are constants, which are to be matched correspondingly to the performed, real digital signal processing of the response variable.

12. The method as claimed in claim 1, wherein:
in the case of iterative approaching of the simulation response variable to the response variable, per iteration time interval, the amplitudes of the velocity of the oscillation and the velocity of the simulated oscillation present at at least two different points in time during the associated iteration time interval are used as operative comparison variables, wherein, at one of the two, different points in time, the amplitudes of the velocity of the oscillation and the velocity of the simulated oscillation are settled.

13. The method as claimed in claim 1, wherein:
the fittable parameters of the digital model are formed by the stiffness $K_0$ and by the quality factor Q or by two variable derived from the stiffness $K_0$ and the quality factor Q.

14. A Coriolis, flow measuring device, which is insertable into a pipeline, said Coriolis, flow measuring device comprises:

an oscillatory system excitable to execute mechanical oscillations and including at least one measuring tube, through which a medium can flow; and at least one exciter;

at least one oscillation sensor;

an electronics, said electronics being adapted to operate said at least one exciter and to evaluate a sensor signal of said at least one oscillation sensor;

said electronics, said at least one exciter and said at least one oscillation sensor are formed in such a manner that said oscillatory system is excitable by the at least one exciter to execute mechanical oscillations according to an excitation input signal and that at least one response variable of the caused mechanical oscillations of said oscillatory system is registrable by the at least one oscillation sensor, wherein:

said excitation input signal exhibits temporary signal modulations occurring in time intervals, and said electronics is adapted to simulate said excited oscillatory system with a digital model, including at least one fittable parameter by:

exciting the digital model in the same manner as said oscillatory system, calculating a simulation response variable of the simulated oscillations according to the digital model and performing over a plurality of signal modulations an iterative conforming of the at least one fittable parameter in such a manner that the simulation response variable interatively approaches the response variable, and said electronics is adapted to ascertain whether a corresponding limit value is exceeded by the at least one, interatively ascertained parameter value for the at least one fittable parameter or by at least one variable derived from the at least one, interatively ascertained parameter value.

* * * * *